United States Patent [19]

Bellamy et al.

[11] Patent Number: 4,741,520

[45] Date of Patent: May 3, 1988

[54] HYDRAULIC ANTIVIBRATION SUPPORTS

[75] Inventors: Alain Bellamy, Vendome; Francois Bodin, Jallans, both of France

[73] Assignee: Hutchinson, France

[21] Appl. No.: 919,868

[22] Filed: Oct. 17, 1986

[30] Foreign Application Priority Data

Oct. 28, 1985 [FR] France .................. 85 15988

[51] Int. Cl.[4] .................. F16F 9/34
[52] U.S. Cl. .................. 267/140.1
[58] Field of Search .................. 188/320; 248/562; 267/8 R, 35, 140.1

[56] References Cited

U.S. PATENT DOCUMENTS 4,415,148 11/1983 Mair et al. .................. 267/140.1 X
4,607,828 8/1986 Bodin et al. .................. 267/140.1
4,632,370 12/1986 Ticks et al. .................. 267/140.1 X Primary Examiner—Duane A. Reger
Attorney, Agent, or Firm—Larson and Taylor

[57] ABSTRACT

The invention relates to a hydraulic antivibration support designed to be interposed between two rigid elements. It comprises a working chamber and a compensating chamber separated by a rigid partition and connected permanently with one another through a throttled passage. Both of these chambers and this passage are filled with liquid. The working chamber is composed of two compartments connected to one another through a throttled annular column bounded internally and externally by two cylindrical surfaces fast respectively to the two rigid elements.

9 Claims, 2 Drawing Sheets

HYDRAULIC ANTIVIBRATION SUPPORTS

The invention relates to antivibration devices designed to be interposed for support and damping purposes between two rigid elements individually subject to certain oscillations and/or vibrations, the damping bringing into play the driving of a liquid through a throttled passage.

By way of non-limiting example, it is indicated that such supports can be mounted between a vehicle chassis and the engine of this vehicle for damping both oscillations imposed on the chassis by irregularities and variations in the level of the ground during the running of the vehicle over the ground and vibrations due to the operation of the engine.

The invention relates more particularly, among supports of the type concerned, to those which are constituted by a fluid-tight box interposed between the two rigid elements, said box comprising a rigid base which can be made fast to one of the two elements, a rigid ring which can be made fast to the other rigid element, an annular elastic support wall preferably of frustoconic shape, connecting the base to the ring in fluid-tight manner and a flexible diaphragm joined in fluid-tight manner to the ring, the inside of this box being divided, by a rigid partition joined to the ring between the annular wall and the diaphragm, into two chambers, namely a working chamber on the side toward the annular wall and a compensating chamber on the side toward the diaphragm, these two chambers communicating with each other permanently through the above throttled passage, which is advantageously constituted by an incurved channel situated in the connecting zone between the annular wall and the ring, and a liquid mass filling the two chambers as well as the throttled passage.

With such a support, the oscillations or vibrations created between the two rigid elements have the effect of bringing these two elements axially together and of separating them from one another in turn.

Oscillations known as "chopping motions" which have a relatively low frequency (for example of the order of 15 Hz) and a relatively high amplitude (higher than 0.5 mm), have the effect of driving back the liquid from one of the two chambers into the other through the throttled passage and conversely, which ensures the desired damping.

The invention is aimed more particularly at the case where the supports of the type concerned are arranged in addition so as to damp certain vibrations having a relatively high frequency (higher then 20 Hz) and a relatively low amplitude (less than 0.5 mm), as is the case, for example, of vibrations caused by the operation at idling speed of the engine of a stationary vehicle, in particular a diesel engine.

In certain known constructions of such supports, this particular damping is ensured by limiting, by a moveable or deformable panel, a portion of the inner surface of the working chamber, which portion is generally provided on the intermediate partition, and by providing means for limiting the amplitude of the movements or deformations of this panel to a low value generally of the order of 0.5 mm.

The panel concerned is relatively fragile and expensive.

In a modification enabling an economy in said panel, that is to say for which the working chamber is exclusively bounded externally by the annular wall and by the rigid intermediate partition, it has been proposed to ensure the above particular damping by making the rigid base fast to a thin disc immersed in the working chamber at the level of the middle zone of the annular elastic support wall. The periphery of this disc is then directly surrounded by a portion of the inner surface of said wall, highly inclined to the support axis.

The volume of liquid contained in the narrow annular space formed between this periphery and this portion is doubtless subject to movements adapted to dampen certain of the vibrations at high frequency imposed on the support.

However the size of this annular space is highly variable during the placing under load, the operation and the life of the support, by reason both of the deformability of the annular elastic wall and the high inclination of the portion, of its inner face, which surrounds the disc.

Now there exists a direct correspondance between on the one hand the size of said annular space, and more precisely the ratio R between its axial length and its cross-section, and on the other hand the frequency F of the vibrations which can be damped at the maximum by the support concerned, for which frequency a resonance phenomenon is created in the liquid mass occupying the annular space.

It is a particular object of the invention to overcome the drawback indicated, by the rendering practically constant over time the size, or at least the ratio R length/cross-section, of the annular space concerned, which permits the above-defined frequency F corresponding to the optimum damping to be determined easily and durably in advance.

To this end supports of the type concerned are essentially characterized according to the invention in that their working chamber is divided into two compartments by at least one annular throttled column bounded internally and externally by two cylindrical or substantially cylindrical surfaces fast respectively to the rigid base and the rigid ring.

The inner surface of the column then limits externally a piston joined to the rigid base and adapted to move axially with clearance in the cylinder bounded internally by the outer surface of the column, joined to the rigid ring, at the rhythm of the oscillations or vibrations to be damped.

In prefered embodiments, recourse is had in addition to one and/or other of the following features:

the annular column is bounded internally by a finger having a cylindrical or substantially cylindrical lateral surface, the annular column is bounded internally by the edge of a transversally overlapping sole plate terminating at a narrower foot, in a support according to the preceding paragraph, the annular column is externally bounded at least in part by a projection of a S-shaped washer traversed with clearance by the foot and not traversable by the sole plate, one at least of the two surfaces bounding the annular column is slightly frustoconic so that the ratio between the axial length and the cross section of said column remains substantially constant when the average relative axial position of these two surfaces varies as a result of the fatigue of the annular wall, one at least of the two surfaces bounding the annular column is constituted by an elastic coating of a rigid part.

The invention comprises, apart from these main features, certain other features which are preferably used at the same time and which will be more explicitly considered below.

In the following, two prefered embodiments of the invention will be described with reference to the accompanying drawings, to be taken, of course, as non-limiting.

FIG. 1 of these drawings shows in axial section an anti-vibration hydraulic support constructed according to the invention.

In each case, the support concerned is designed to be inserted vertically or in a direction slightly inclined to the vertical between a rigid bearer member constituted by a vehicle chassis and a rigid supported member constituted by an internal combustion engine.

The words "high, low, upper, lower, cup" used in the following description, are by way of non-limiting example since the support described is perfectly usable in the reverse sense to that adopted for this description.

Figure 1:
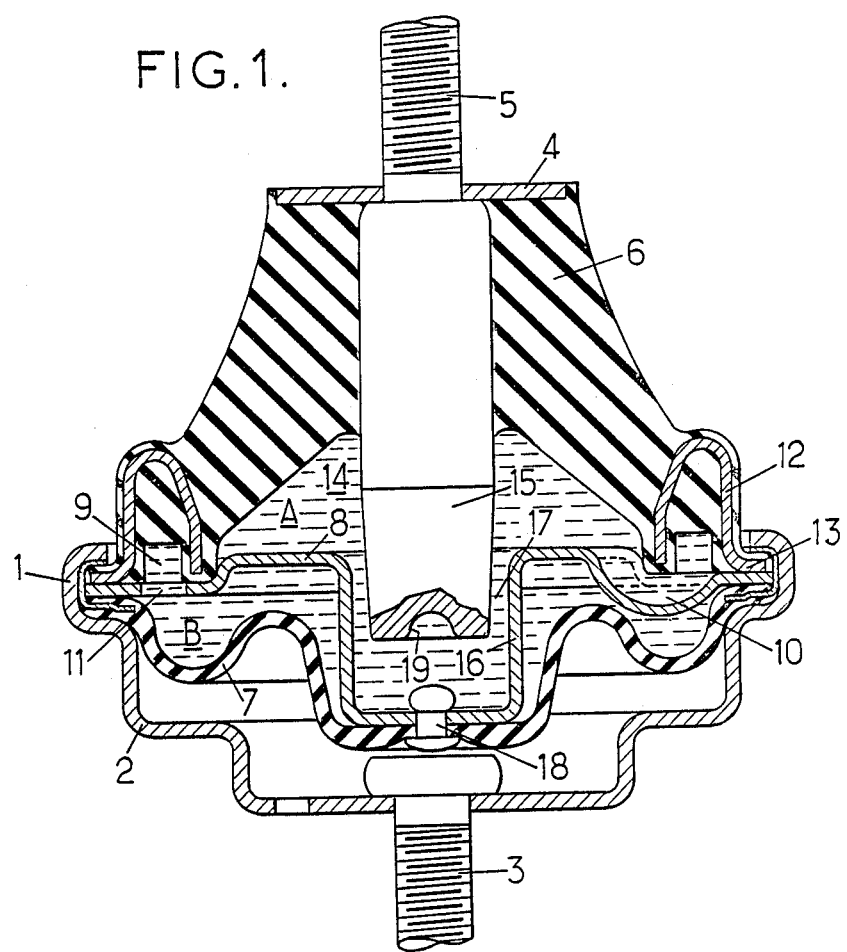

The support shown in FIG. 1 is in the general shape of a fluid-tight box comprising:

a rigid ring 1 constituting the edge of a bottom metal cup 2 itself fixable to the chassis of a vehicle by means of a standby bolt 3, this bolt passing downwardly through the center of said cup, an upper plate 4 traversed upwardly by a standby bolt 5 serving for the fastening of the engine of the vehicle, an elastic annular wall 6 sufficiently thick to transmit the loads from the engine to the chassis, which wall is bounded by two downwardly flared frustoconic surfaces and of which the small base, positioned above, is connected to the plate 4, its lower large base being joined in fluid-tight manner to the ring 1, and a lower fluid-tight end flexible diaphragm 7 contained inside the cup 2, at a short distance from the latter, the edge of this diaphragm being fixed in fluid-tight manner to the ring 1.

An intermediate metal partition divides the inside of the box thus formed into two chambers, namely an upper working chamber A and a compensating or lower equilibrating chamber B.

The periphery of the partition 8 is for this purpose joined in fluid-tight manner to the ring 1, between the thick wall 6 and the diaphragm 7.

A throttled passage 9 forms a permanent communication of the two chambers A and B with one another.

This passage 9 is constituted here by an incurved channel extending over an arc of about 315 degrees, which channel is bounded upwardly by a groove formed in the base of the thick wall 6 and below by an annular portion of the intermediate partition 8.

One of the ends of the channel 9 is joined to the chamber A through a boss 10 formed in the portion of the opposite partition 8 and the other end of the channel 9 is joined to the chamber B through a hole 11 formed in the partition 8.

The base of the thick wall 6 is advantageously reinforced by a metal ring 12 buried in the mass of this base and constituted by a ring of folded metal extended outwardly by a radial collar 13.

The assembly on the ring 1 of the respective edges of the collar 13, the diaphgram 7 and the intermediate partition 8 is ensured by superposition of these three edges and by their clamping or crimping inside the ring 1 which is closed back on them.

A liquid mass 14 fills the chambers A and B as well as the channel 9.

The head of the bolt 5 is extended axially downwards by a rigid finger 15 forming with it a body of which the lower end penetrates with a radial play J and to an axial depth L into a cylindrical cup 16 formed by the central portion of the partition 8.

The portion of the finger 15 which extends down into the cup 16 defines with the latter an annular column 17 of radial thickness J, of axial height L and whose inner diameter D is equal to the outer diameter of said downwardly extended portion.

This column 17 defines a throttled passage for the liquid between the inside of the cup 16 and the remainder of the chamber A.

The dimensions of this passage, and in particular the ratio between its length L and its cross-section S, are determined so as to damp the desired vibrations, particularly by placing the liquid mass filling said passage in resonance.

In advantageous embodiments, the respective values of the dimensions D, L and J are respectively of the order of 20 mm, from 5 to 15 mm, and from 0.5 to 3 mm.

There is also seen in FIG. 1:

a rivet 18 fixing the center of the flexible diaphragm 7 to the center of the cup 16, and a recess 19 hollowed in the lower terminal surface of the finger 15 and adapted to cap the head of the rivet 18, which is inside the chamber A when the support is fully compressed.

To compensate automatically for the gradual weakening over time of the thick wall 6 with respect to the ratio L/S, a frustoconic shape is advantageously given to one at least of the two lateral surfaces which bound this column, and preferably to the outer lateral surface of the finger 15; this ratio thus remains constant whatever the average degree to which the finger 15 is driven into the cup 16.

Figure 2:
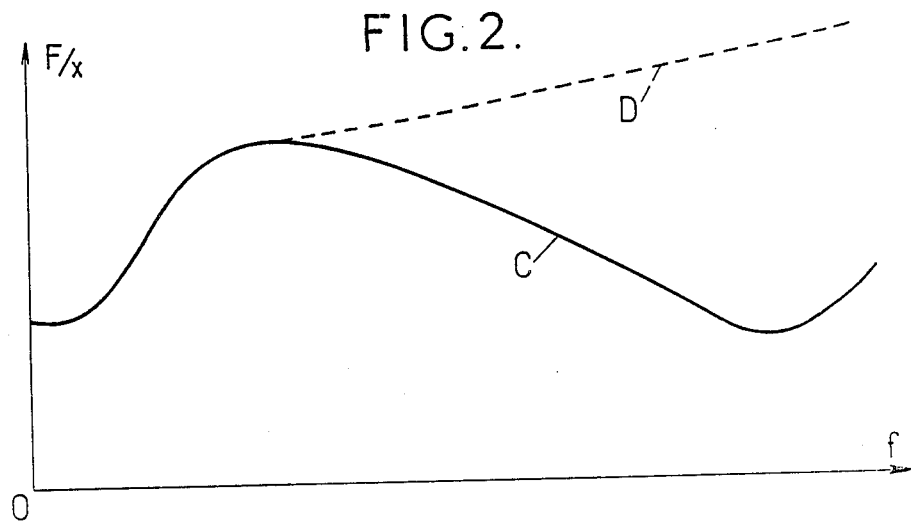
FIG. 2 is graph illustrating certain features of said support.

The graph shown in FIG. 2 shows the advantage presented by the above described support.

In this graph, there is plotted as abscissae the frequency of the vibrations to be damped and as ordinates the stiffness or rigidity of the support.

This stiffness is expressed as a ratio F/X, F being the force applied vertically to the support between its bolts 3 and 5 and X, the amplitude of the alternating vertical movement effected between these two bolts or, stated differently, between the finger 15 and the cup 16.

It is to be noted that this alternating vertical movement, effected at the rhythm of the oscillations or vibrations to be damped, introduces a sort of pumping effect between the finger 15 forming a piston and the cup 16 forming a cylinder; during the pumping the liquid 14 contained in the annular radial clearance corresponding to the column 17 interposed between the piston and the cylinder undergoes diverse stresses, in particular of frictional driving and drawing.

The curve corresponding to the above described support is that labeled C shown in full lines in FIG. 2.

By way of comparison, there is represented in dashed lines the curve D corresponding to the same support in which the annular column 17 would have been eliminated, for example by truncating the finger 15.

It is seen that, if the support shows in each of the two cases a relatively low frequency range (less than 15 Hz) for which the stiffness is relatively low, this stiffness remains relatively high at all the other frequencies for the support devoid of the annular column, whereas it shows on the contrary a second range of flexibility or slight stiffness at high frequencies for the support according to the invention.

These high frequencies are generally comprised between 150 and 250 Hz.

The presence in the working chamber of the annular column 17 or "second column" of liquid—it being possible to consider the channel 9 as a "first column"—enables it alone to absorb certain vibrations imposed on the support at said relatively high frequencies, which permits appreciable improvement in the comfort of the cab of the vehicle in respect of silence and absence of vibration.

It is to be noted that this advantage is obtained extremely economically and reliably, and in particular without resorting to a deformable or mobile partition subject to vibration.

Figure 3:
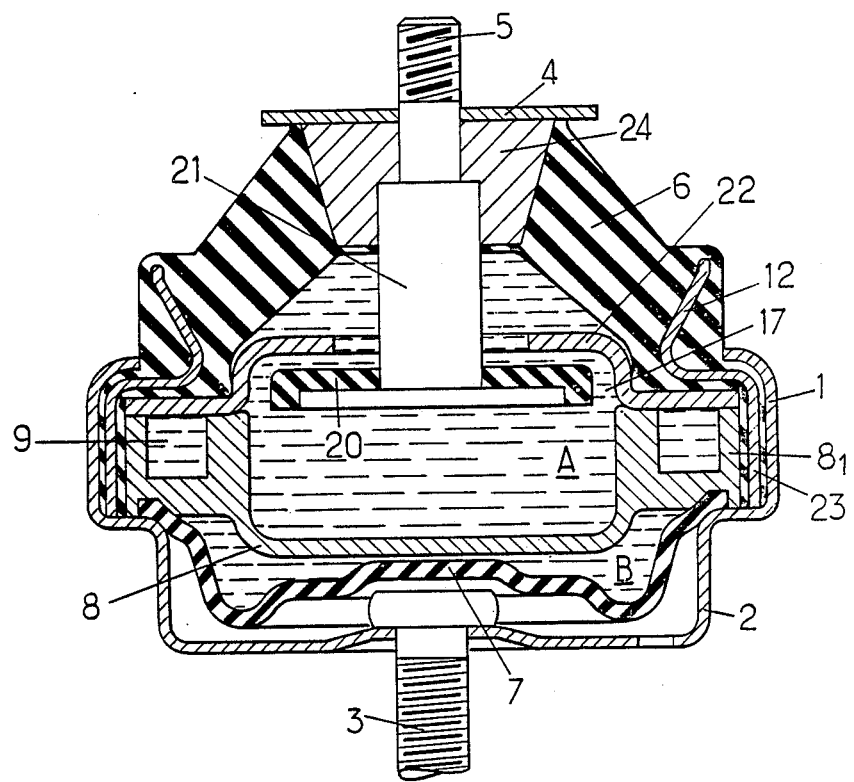
FIG. 3 shows in axial section a modification of such a support also according to the invention.

FIG. 3 shows a modification in which the identical elements to those described above have been assigned the same reference numbers as previously.

This modification differs essentially from the preceding one in that the annular column of liquid 17 is here bounded:

internally by the edge of a transversely overlapping sole plate 20 terminating at a narrower foot 21 which extends downwardly from the bolt 5, and externally by a projection of a washer 22 profiled as an S which engirdles said foot and its sole plate with clearance and whose periphery is applied against the intermediate partition 8.

The inner diameter of the washer 22 is chosen to be smaller than the outer diameter of the sole plate 20, which presents the advantage of conferring on the support a security with respect to detachment forces due to the fact of the mutual abutment of these two elements.

In addition, the modification of FIG. 3 differs from that of FIG. 1 in the following several other points:

the channel 9 is here bounded internally by an incurved groove hollowed in a thick beading 8₁ forming the peripheral zone of the partition 8 and upwardly by an annular zone of the washer 22, the ring 12 which reinforces the base of the wall 6 is here extended below by an axial skirt 23, the foot 21 is housed as well as the bolt 5 in a bored metal stud 24 and covered by the small plate 4.

As a result, whatever the embodiment adopted, there is finally provided an anti-vibration hydraulic support whose constitution and operation results sufficiently from the foregoing.

This support shows numerous advantages over those known at present, in particular as regards the low cost price, the robustness and the possiblity of determining very easily in advance and definitely the ratio length/-section of the "high frequency" throttled column and hence the value F of the high frequency for which the damping of the support is a maximum.

As is self-evident, and as emerges from the foregoing, the invention is in no way limited to those of its types of application and embodiments which have been more especially envisaged; it encompasses, on the contrary, all modifications thereof, particularly:

those where the annular column would not be single, but replaced by a plurality of such columns, identical or not, those where one at least of the two elements bounding the annular column would be joined to the corresponding rigid element (base or ring) not rigidly, but through an elastic connecting body not urged to deformation by the oscillations or vibrations to be damped, those where the above finger, bounding the annular column internally, would be tubular instead of being solid, those where the annular column would be bounded internally by the edge of a collar extending radially outwards the base of a bell element fast to the rigid base, those where, the annular column being bounded internally by the edge of an overlapping sole plate or collar and a washer being provided to prevent the tearing by abutment against it of this sole plate or collar, said column would be bounded externally by a rigid portion other than a projection of said washer, those where at least one hole would be formed in the rigid intermediate partition, this hole being either relatively small and permanently open, in which case it constitutes a throttled passage in parallel with the passage 9, its dimensions being determined so as to ensure the damping of oscillations other than those taken care of by said passage 9, or indeed relatively wide and closeable at will by suitable means, which permits the passage 9 to be short-circuited, those where one at least of two surfaces bounding the annular column is constituted at least in part by an elastic covering applied to a rigid part.

We claim:

1. Antivibration device designed to be interposed for support and damping purposes between two rigid elements, constituted by a fluid-tight box comprising a rigid base which can be made fast to one of the two rigid elements, a rigid ring which can be made fast to the other rigid element, an annular elastic support wall connecting the base to the ring in fluid-tight manner and a flexible diaphragm attached in fluid-tight manner to the ring, the inside of this box being divided by a rigid partition attached to the ring between the annular wall and the diaphragm, into two chambers, namely a working chamber on the side toward the annular wall and a compensating chamber on the side toward the diaphragm, these two chambers communicating with one another permanently through a throttled passage and a liquid mass filling the two chambers as well as the throttled passage, characterized in that the working chamber is divided into two compartments connected to one another through at least one throttled annular column bounded internally and externally by two cylindrical or substantially cylindrical surfaces fast respectively to the rigid base and the rigid ring.

2. Device according to claim 1, characterized in that the annular column is bounded internally by a finger having a cylindrical or substantially cylindrical lateral surface.

3. Device according to claim 2, characterized in that the annular column is bounded externally by a cup formed in the central portion of the intermediate partition.

4. Device according to claim 1, characterized in that the annular column is bounded internally by a transversely overlapping sole plate terminating a narrower foot.

5. Device according to claim 4, characterized in that the foot is hollow and is in the form of a bell element whose edge is extended radially by a collr constituting the overlapping sole plate.

6. Device according to claim 4, characterized in that it comprises a washer fast to the rigid ring, which washer is traversed with clearance by the foot, but not traversable by the overlapping sole plate.

7. Device according to claim 6, characterized in that the washer is profiled as an S and in that the annular column is bounded externally at least in part by a projection of this washer.

8. Device according to claim 1, characterized in that one at least of the surfaces bounding the annular column is constituted at least in part by an elastic covering of a rigid part.

9. Device according to claim 1, characterized in that one at least of the two surfaces bounding the annular column is slightly frustoconic so that the ratio between the actual length and the cross-section of said column remains substantially constant when the mean relative axial position of these two surfaces varies as a result of the fatigue of the annular wall.

* * * * *